(12) United States Patent
Pedersen

(10) Patent No.: US 8,232,911 B1
(45) Date of Patent: Jul. 31, 2012

(54) METHOD AND SYSTEM OF REDUCING FRIENDLY FIRE IN ANTI-AIRCRAFT ENGAGEMENTS

(75) Inventor: Richard N. Pedersen, Toms River, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 489 days.

(21) Appl. No.: 12/570,281

(22) Filed: Sep. 30, 2009

(51) Int. Cl.
*G01S 13/78* (2006.01)
(52) U.S. Cl. .......................... 342/45; 342/96
(58) Field of Classification Search ............ 342/45, 342/95–97
See application file for complete search history.

(56) References Cited

U.S. PATENT DOCUMENTS

| | | | | |
|---|---|---|---|---|
| 3,230,348 A | * | 1/1966 | Hammond, Jr. ............ | 235/400 |
| 4,048,636 A | * | 9/1977 | Bishop ..................... | 342/45 |
| 5,596,332 A | * | 1/1997 | Coles et al. ................ | 342/455 |
| 6,483,454 B1 | * | 11/2002 | Torre et al. ................ | 342/30 |
| 7,417,583 B2 | * | 8/2008 | Wood et al. ................ | 342/123 |
| 7,868,814 B1 | * | 1/2011 | Bergman .................. | 342/45 |
| 8,098,183 B1 | * | 1/2012 | Pedersen .................. | 342/13 |
| 2005/0230563 A1 | * | 10/2005 | Corcoran, III ............. | 244/175 |

FOREIGN PATENT DOCUMENTS

RU 2252900 C1 * 5/2005

* cited by examiner

*Primary Examiner* — John B Sotomayor
(74) *Attorney, Agent, or Firm* — Howard IP Law Group, P.C.

(57) ABSTRACT

A method and system provide for confirmation of friendly aircraft as a backup to conventional IFF (identification, friend or foe) telecommunication systems and methods. An IFF secondary radar signal is generated and directed to an aircraft. When no confirming response is received within a pre-determined time period, the invention provides for generating and transmitting a pre-arranged modulated signal to the aircraft. In response to receiving the pre-arranged modulated signal, the aircraft notifies the aircrew to execute a pre-arranged kinematic maneuver that is detected by the systems using radar means to confirm that the aircraft is a friendly aircraft.

26 Claims, 2 Drawing Sheets

METHOD AND SYSTEM OF REDUCING FRIENDLY FIRE IN ANTI-AIRCRAFT ENGAGEMENTS

GOVERNMENT RIGHTS

This invention was made with Government Support under Contract No. N00024-05-C-5346 awarded by the Department of the Navy. The Government has certain rights in this invention.

FIELD OF THE INVENTION

The invention relates most generally to radar systems used in anti-aircraft warfare and more particularly to a method and system for supplementing an IFF, identification friend or foe, telecommunication system for reducing friendly fire.

BACKGROUND

Anti-aircraft warfare, AAW, involves engaging hostile military aircraft in defense of ground objectives, ground or naval forces or denial of passage through a specific airspace region, area or anti-aircraft zone. It is also commonly used to deny entry into national airspace to unauthorized aircraft.

A significant cause for concern in AAW engagements prosecuted by ship-based or other weapon systems is the elimination, or at least reduction, of fratricide against friendly aircraft. The primary conventional method for preventing fratricide is by using the conventionally known IFF, Interrogate Friend or Foe, secondary radar system. IFF is an electronic system that uses radar to determine the intent of an aircraft, with the speed of a computer. Contemporary IFF is a two-channel system with one frequency, 1030 megahertz, generally used for the interrogating system and another frequency, commonly 1090 megahertz, used for the reply. The interrogating signals may be encrypted and the friendly aircraft includes a transponder. The transponder receives the interrogating signals and, responsive to an interrogating signal, send a return signal confirming the aircraft as friendly. In the case of an encrypted signal, the transponder decodes the encrypted message, validates the encrypted message and sends a coded or encrypted message back to the interrogating system which receives the return signal and confirms the validation of friendly aircraft.

There are at least two areas of concern regarding the use of IFF to minimize fratricide. An equipment failure on the targeted friendly aircraft would prevent it from successfully responding to IFF interrogations and there may be a need for the targeted friendly aircraft to maintain radio silence for operational considerations, such as would be the case when the possibility of radio transmissions might undesirably expose the aircraft to hostile fire.

It is of tantamount importance to reduce fratricide. The detrimental effects of fratricide and the fear thereof may include hesitation to conduct limited visibility operations, loss of confidence in a unit's leadership, increase of leader self doubt, hesitation to use supporting combat systems, oversupervision, loss of initiative, loss of aggressiveness during fire and maneuver, disrupted operations, needless loss of combat power and numerous other negative aspects.

The present invention provides a method and system that addresses the limitations associated with the use of IFF to minimize fratricide.

SUMMARY OF THE INVENTION

To address these and other needs and in view of its purposes, the invention provides a method for distinguishing friendly aircraft from hostile aircraft. The method comprises generating an interrogating signal comprising an IFF (identification, friend or foe) secondary radar signal and transmitting the interrogating signal to an aircraft. The method further provides for transmitting a modulated radio signal to the aircraft when no return signal is received from the aircraft in response to the interrogating signal, within an expected time period. The method further provides for interpreting a kinematic maneuver by the aircraft to confirm that the aircraft is a friendly aircraft.

According to another aspect, a system for distinguishing friendly aircraft from hostile aircraft is provided. The system includes an interrogation system comprising an IFF (identification, friend or foe) secondary radar system capable of generating and transmitting an interrogating signal comprising a secondary radar signal to an aircraft and a system capable of generating and modulating a radio signal and transmitting the modulated radio signal to the aircraft. Also provided is a radar system capable of generating a radar signal and transmitting the radar signal to the aircraft, the radar system also capable of detecting return radar signals reflected from the aircraft that indicate a kinematic maneuver having been performed by the aircraft. The radar system and system capable of generating, modulating and transmitting the modulated radio signal may be a single apparatus. In some exemplary embodiments, the radar system capable of generating the radar signal may also generate, modulate and transmit the modulated radio signal.

According to another aspect, a system for distinguishing friendly aircraft from hostile aircraft is provided. The system includes an interrogation system comprising an IFF (identification, friend or foe) secondary radar system capable of generating and transmitting an interrogating signal comprising a secondary radar signal, to an aircraft. The system also includes a system capable of generating and modulating a radio signal and transmitting the modulated radio signal to the aircraft and a radar system capable of generating a radar signal and transmitting the radar signal to the aircraft. The radar system is capable of detecting return radar signals reflected from the aircraft that indicate a kinematic maneuver performed by the aircraft. The system further includes a first aircraft equipped with a detector capable of receiving the modulated radio signal, comparing the modulated radio signal to a pre-arranged modulated radio signal and directing an aircrew to execute the kinematic maneuver when the modulated radio signal is substantially the same as a pre-arranged modulated radio signal. The kinematic maneuver is a pre-arranged kinematic maneuver performed to acknowledge the receipt of the pre-arranged modulated radio signal and establishes that the aircraft is a friendly aircraft.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing.

DETAILED DESCRIPTION

The invention provides a system and method for distinguishing friendly aircraft from hostile aircraft when a conventional IFF (identification, friend or foe) secondary radar system is either not functioning or when it may be desirable for a friendly aircraft to maintain radio silence for any of various operational considerations. The invention includes a base system such as a ship-based or ground system that includes a weapons system. The invention also provides for equipping friendly aircraft with a detector such as a radio receiver capable of receiving and acknowledging a pre-determined modulated radio signal that the base system sends when a response to the IFF interrogating signal is not received within an expected or pre-determined time period. The invention also provides establishing the pre-arranged modulated radio signal and confidentially notifying the base system and friendly aircraft of the same. The invention further provides establishing a confidential pre-determined, i.e. pre-arranged, kinematic acknowledgement maneuver to be performed by the friendly aircraft responsive to having confirmed receipt of the pre-determined modulated radio signal, such maneuver confirming that the aircraft is a friendly aircraft. The set of pre-determined modulated radio signal/pre-determined acknowledgement maneuver is secretly maintained and can be dynamically changed on a regular basis. A radar system is used to detect the kinematic maneuver performance by the aircraft.

Figure 1:
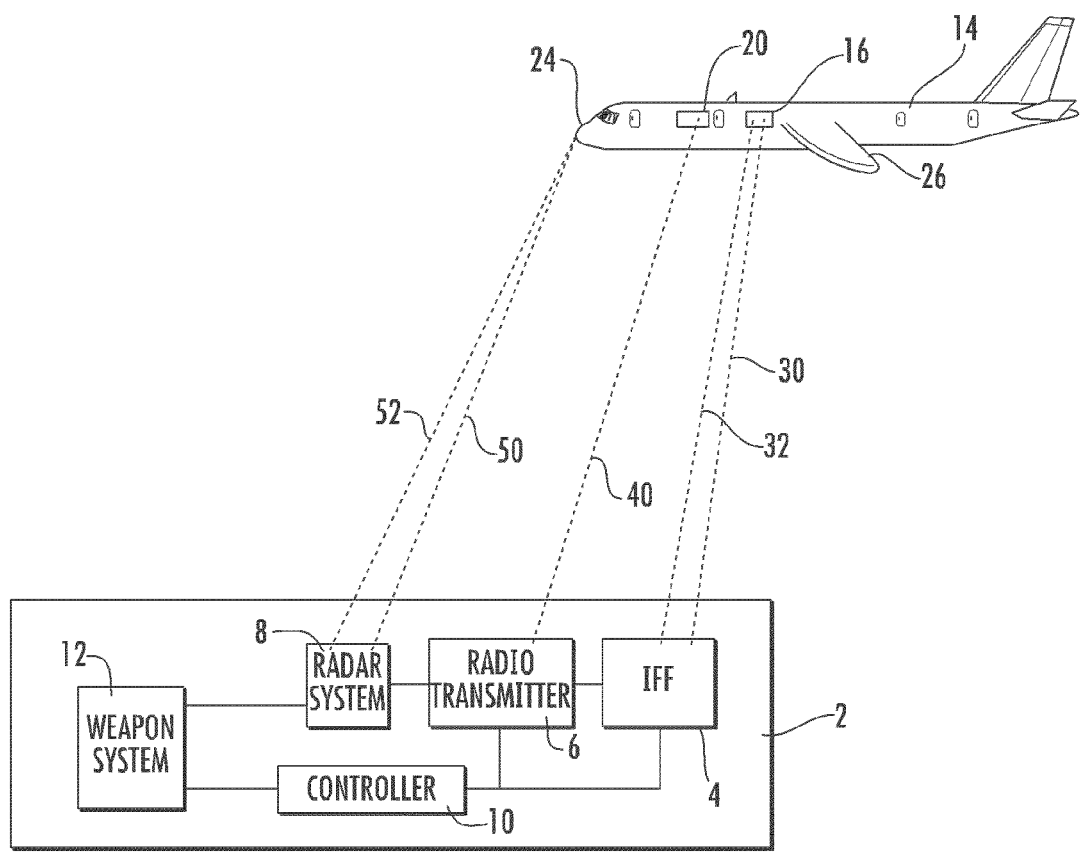
FIG. 1 is a schematic representation, including a box diagram, illustrating a system according to the invention.

FIG. 1 is a schematic illustrating a system according to the invention. The system includes base system 2. Base system 2 is an aircraft identification system for determining whether a target aircraft is a friendly or hostile aircraft. Base system 2 may be on the ground, on a sea vessel or even on a further aircraft and includes an IFF unit that generates and transmits interrogating signals. Base system 2 includes IFF system 4, radio transmitter system 6 and radar system 8, according to one exemplary embodiment. In another exemplary embodiment, radio transmitter system 6 and radar system 8 may be a single system or apparatus. Base system 2 also includes controller 10 and weapons system 12 and each of these components of base system 2 is electrically coupled to controller 10 and communicates with one another via controller 10 which provides for communication between the components and may include a processor capable of carrying out functions as will be described infra. Equipped in a corresponding friendly aircraft 14, such as may be a target aircraft, is at least a transponder 16 and a detector such as radio receiver unit 20 that advantageously includes a processor.

Figure 2:
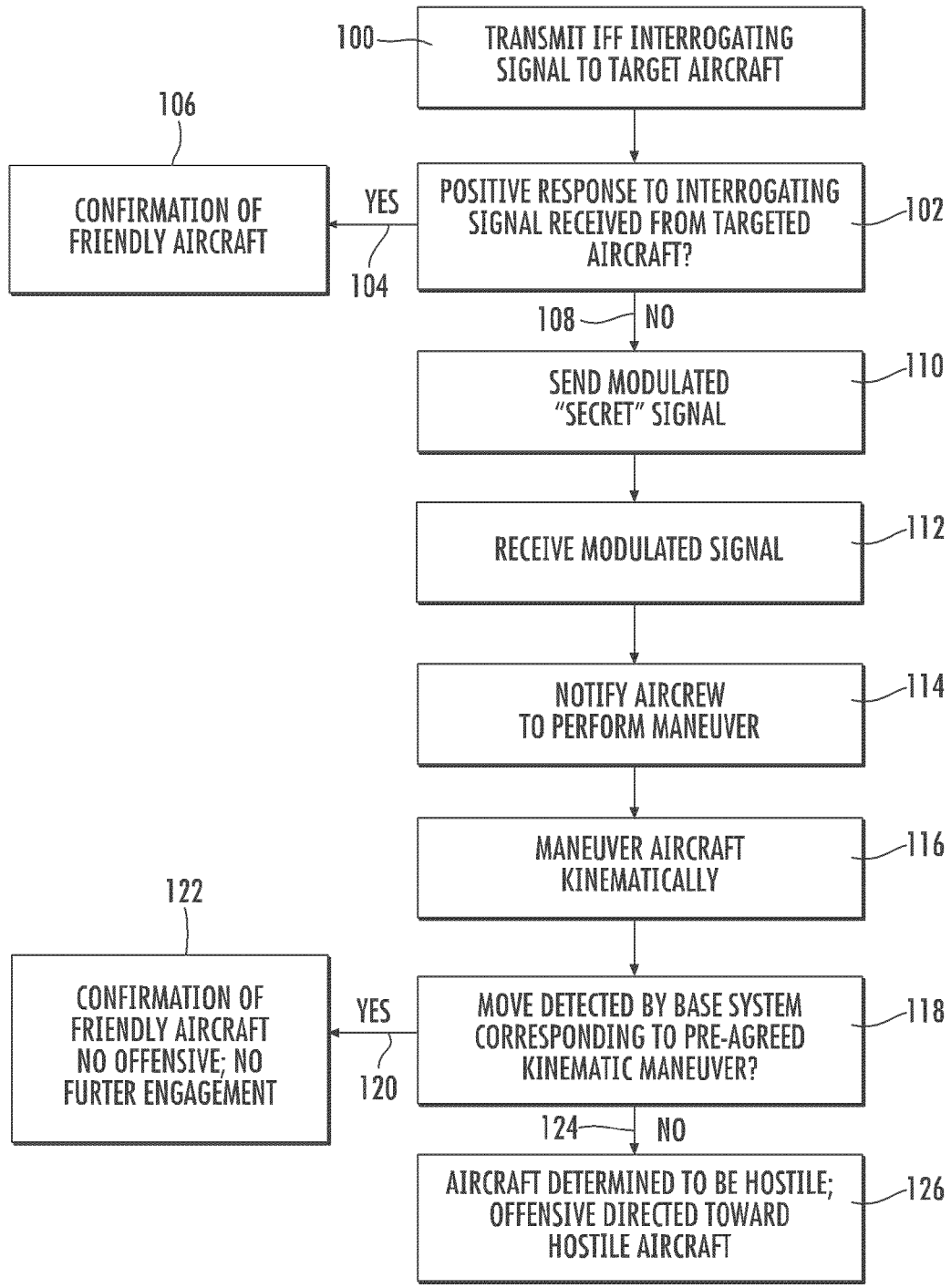
FIG. 2 is a flow chart illustrating an exemplary method of the invention.

Now referring to both FIGS. 1 and 2, IFF system 4 sends an interrogating signal at step 100 to a target aircraft to assess whether the target aircraft is a hostile aircraft or a friendly aircraft. Prior to engagement, friendly aircraft and base system 2 are each made aware of a confidential pre-determined modulated radio signal and a pre-determined kinematic acknowledgement maneuver to be performed by a friendly aircraft responsive to receiving the pre-determined modulated radio signal to confirm that the aircraft is indeed friendly. Conventional IFF secondary radar systems as presently available in the art, may be used. IFF system 4 is coupled to controller 10 and generates and transmits interrogating signal 30 directed to a target aircraft. Interrogating signal 30 may be an encrypted or otherwise coded signal that is advantageously sent at about 1030 megahertz but other frequencies may be used in other exemplary embodiments and interrogating signal 30 may be non-encrypted or otherwise coded, in other exemplary embodiments. Contemporary IFF systems are generally two-channel systems capable of sending interrogating signal 30 using one frequency and receiving a reply radar signal 32 sent at another frequency, commonly about 1090 megahertz, though other frequencies may be used in other exemplary embodiments. Encrypted/coded interrogating signals 30 are received by an antenna electrically coupled to transponder 16 which decodes the encrypted or coded message, validates the encrypted message and sends a coded or encrypted message back to the interrogating system via signal 32, when functioning properly and in the absence of any need to maintain radio silence.

The interrogating system, IFF system 4, is capable of receiving advantageously encrypted return signal 32 and confirming the validation of friendly aircraft. Base system 2 includes one or more other systems that are usable when return signal 32 is not forthcoming from the target aircraft. This may be the case when a hostile aircraft is the target. Return signal 32 may also not be transmitted by a friendly aircraft, however. This may be due to a need to maintain radio silence by the friendly target aircraft or due to a malfunction in any portion of transponder 16 such as the receiving function, the decoding function, the validation portion or the return signal generating portion of transponder 16. Return signal 32 may also be absent due to other problems with friendly aircraft 14 or with IFF system 4.

At step 102 of FIG. 2, if a positive response generated by the targeted aircraft is received by IFF system 4, yes 104, the aircraft is confirmed as friendly at step 106 and the weapons system is not enabled. If no 108, then radio transmitter system 6 is directed by controller 10 to send a pre-determined modulated radio signal when no positive response has been received from the identified aircraft after a pre-determined time has passed after sending the interrogating signal 30 at step 100. In an advantageous embodiment, return radar signal 32 must be received within 2200 microseconds but other time periods, such as within 2500 microseconds or a greater time period, may be used in other exemplary embodiments and this value may be stored in memory of controller 10. In still other exemplary embodiments, other time periods within which return radar signal 32 must be received, may be used. The absence of receiving a return signal during the expected time triggers controller 10 to direct radio transmitter system 6 to send the pre-determined modulated radio signal. Radio transmitter system 6 generates and modulates modulated radio signal 40 and transmits this pre-determined modulated radio signal 40 to the target aircraft at step 110. The nature of modulated radio signal 40 is known according to a pre-arranged understanding with friendly aircraft and may be stored on a memory device of base system 2, but will be classified or confidential, i.e. "secret" information. The modulated radio signal 40 may be produced by generating a carrier signal and modulating the carrier signal by at least one of amplitude modulation, frequency modulation and pulse modulation. The pulse modulation may be a modulation of pulse width, a modulation of pulse spacing or a modulation of number of pulses per unit. By virtue of having previously been informed of the confidential, pre-determined modulated radio signal, radio receiver unit 20 of a friendly aircraft such as friendly aircraft 14, will be capable of receiving modulated radio signal 40 and advantageously includes a processor capable of confirming that the modulated radio signal 40 is the pre-arranged modulated signal.

An antenna of radio receiver unit 20 of friendly aircraft 14 serves as a detector and receives the modulated radio signal 40 at step 112 and radio receiver unit 20 compares the detected modulated radio signal to the pre-arranged modulated radio signal. If the detected modulated radio signal is confirmed to be substantially the same as the pre-arranged modulated radio signal, as would be confirmed by a friendly aircraft, the processor of radio receiver unit 20 notifies the aircrew at step 114 to perform a secret, pre-arranged kinematic maneuver that serves to acknowledge receipt of the pre-arranged modulated radio signal and establishes the aircraft as a friendly aircraft. Various systems and methods of communication may be used to communicate with the aircrew that the modulated radio signal 40 has been received and confirmed as the pre-arranged modulated radio signal, and that the pre-arranged kinematic maneuver is to be performed.

Upon being notified at step 114 to perform the maneuver, the aircrew responds at step 116 by directing the friendly aircraft to execute the pre-arranged kinematic acknowledgment maneuver. At step 116, friendly aircraft 14 is maneuvered according to the pre-arranged kinematic maneuver which may include any of various maneuvers that are detectable by a conventional radar system such as radar system 8. Such kinematic maneuvers may include but are not limited to producing a change in flight path of friendly aircraft 14 such as by dipping one of wings 26 of the aircraft, raising or lowering nose 24 of the aircraft, rotating nose 24 of the aircraft, yawing the aircraft, or performing a somersault.

At step 118, it is determined whether the kinematic maneuver was detected by base system 2, in particular by radar system 8, and whether the detected kinematic maneuver corresponds to the pre-arranged kinematic acknowledgment maneuver. Radar system 8 may include conventional radar means such as are capable of sending out transmitted radar signal 50 which reflects off of friendly aircraft 14 and produces a reflected radar signal 52 detectable by radar system 8 of base system 2 at step 118. Any kinematic maneuver executed by friendly aircraft 14 is evidenced by reflected radar signal 52, detected by radar system 8 and compared to the previously-agreed upon kinematic maneuver to be carried out by a friendly aircraft. Processor 10 may do the comparison and may have advantageously stored information on the pre-arranged kinematic acknowledgment maneuver.

If the targeted aircraft is indeed a friendly aircraft such as friendly aircraft 14, the detected kinematic maneuver corresponds to the pre-arranged kinematic acknowledgement maneuver, i.e. yes 120, and weapons system 12 is not activated as the aircraft is confirmed as friendly at step 122 and no offensive or further engagement of the targeted aircraft is carried out. The pre-arranged kinematic acknowledgement maneuver may be stored in a memory component of controller 10 or otherwise known by the operators of radar system 8 If no kinematic acknowledgement maneuver is detected by radar system 8 or if the acknowledgement maneuver detected by radar system 8 does not correspond to the pre-arranged acknowledgement maneuver to be carried out by friendly aircraft, i.e. "no" at step 124, the target aircraft is concluded to be a hostile aircraft and is dealt with appropriately, for example by activating weapons system 12 to direct fire at the hostile aircraft at step 126.

Although described in terms of base system 2 including radio transmitter system 6 and radar system 8 in the illustrated embodiment, according to another exemplary embodiment, radar system 8 may also be used to generate and modulate modulated radio signal 40 and transmit this pre-determined modulated radio signal to the target aircraft at step 110. According to this exemplary embodiment, only a single system or apparatus such as radar system 8, is used in addition to IFF system 4, and according to this exemplary embodiment, radar system 8 may transmit modulated radio signal 40 in addition to sending out transmitted radar signal 50 which reflects off of friendly aircraft 14, and detecting reflected radar signal 52 at step 118.

According to various exemplary embodiments, the nature of the pre-arranged modulated radio signal may be changed on a regular basis such as daily, weekly, or over other periods of time and the aircrew and the radio receiver unit 20 of aircraft 14 so notified. The acknowledgment maneuver, i.e. the kinematic maneuver carried out responsive to having received and acknowledged the modulated signal, may also be changed regularly such as on a daily, monthly, weekly or other time period, basis.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for distinguishing friendly aircraft from hostile aircraft, said method comprising:
generating an interrogating signal comprising an IFF (identification, friend or foe) secondary radar signal and transmitting said interrogating signal to an aircraft;
when no return signal is received from said aircraft over a pre-determined time period following said transmitting said interrogating signal, transmitting a modulated radio signal to said aircraft; and
interpreting a kinematic maneuver by said aircraft to confirm that said aircraft is a friendly aircraft.

2. The method as in claim 1, wherein said pre-determined time period is about 2200-2500 microseconds.

3. The method as in claim 1, wherein said interpreting comprises generating a radar signal, transmitting said radar signal to said aircraft and receiving a reflected radar signal from said aircraft, said reflected radar signal indicative of said kinematic maneuver of said aircraft.

4. The method as in claim 1, further comprising equipping said aircraft with a detector that detects said modulated radio signal, compares said modulated radio signal to a pre-arranged modulated radio signal and directs said aircraft to execute said kinematic maneuver when said modulated radio signal is substantially identical to said pre-arranged modulated radio signal.

5. The method as in claim 1, wherein said kinematic maneuver is done responsive to a receiver on said aircraft receiving said modulated radio signal and notifying an aircrew on said aircraft.

6. The method as in claim 5, wherein said receiver identifies said modulated radio signal as a pre-arranged modulated radio signal and said kinematic maneuver comprises a pre-arranged kinematic maneuver responsive to said identification of said modulated radio signal as said pre-arranged modulated radio signal.

7. The method as in claim 1, wherein said transmitting a modulated radio signal comprises establishing a carrier wave and modulating said carrier wave by at least one of amplitude modulation, frequency modulation, and pulse modulation.

8. The method as in claim 1, wherein said kinematic maneuver comprises a change in flight path effectuated by one of dipping said aircraft's left wing, dipping said aircraft's right wing, raising said aircraft's nose, lowering said aircraft's nose, rotating said aircraft's nose and yawing said aircraft.

9. The method as in claim 1, wherein said interrogating signal comprises an encrypted signal with a frequency of about 1030 megahertz.

10. A system for distinguishing friendly aircraft from hostile aircraft, said system comprising:
an interrogation system comprising an IFF (interrogate friend or foe) secondary radar system capable of generating an interrogating signal comprising a secondary radar signal and transmitting said interrogating signal to an aircraft;
an apparatus capable of generating and modulating a radio signal and transmitting said modulated radio signal to said aircraft and further capable of generating a radar signal, transmitting said radar signal to said aircraft and detecting return radar signals reflected from said aircraft that indicate a kinematic maneuver by said aircraft.

11. The system as in claim 10, wherein said apparatus comprises:
a first system being a radio transmitter capable of generating, modulating and transmitting said modulated radio signal; and
a second system being a radar system capable of generating said radar signal, transmitting said radar signal to said aircraft and detecting said return radar signals reflected from said aircraft.

12. The system as in claim 10, wherein said apparatus further comprises a processor capable of directing said apparatus to produce said modulated radio signal when no responsive signal to said interrogating signal is received within a pre-determined time period following said transmitting said interrogating signal, said modulated radio signal being substantially a pre-arranged modulated radio signal.

13. The system as in claim 12, wherein said processor is further capable of directing said apparatus system to generate and transmit said radar signal when no responsive signal to said interrogating signal is received within a pre-determined time period following said transmitting said interrogating signal.

14. The system as in claim 12, wherein said processor is further capable of storing information on a pre-arranged kinematic maneuver and comparing said kinematic maneuver by said aircraft to said pre-arranged kinematic maneuver.

15. The system as in claim 10, wherein said apparatus is capable of producing said modulated radio signal by generating a carrier signal and modulating said carrier signal by one of amplitude modulation, frequency modulation and pulse modulation.

16. The system as in claim 15, wherein said pulse modulation comprises one of modulation of pulse width, modulation of pulse spacing and modulation of number of pulses.

17. The system as in claim 10, wherein said modulated radio signal is a pre-arranged modulated radio signal stored in a memory device, and wherein said apparatus generates and modulates said modulated radio signal when no responsive signal to said interrogating signal is received within a pre-determined time period following said transmitting said interrogating signal.

18. The system as in claim 10, wherein said apparatus is further capable of confirming said aircraft as a friendly aircraft based on said detected kinematic maneuver by said aircraft.

19. The system as in claim 10, further comprising a weapons system capable of firing at said aircraft if said aircraft does not perform said kinematic maneuver responsive to said transmitted modulated radio signal.

20. A system for distinguishing friendly aircraft from hostile aircraft, said system comprising:
an interrogation system comprising an IFF (interrogate friend or foe) secondary radar system capable of generating an interrogating signal comprising a secondary radar signal and transmitting said interrogating signal to an aircraft;
an apparatus capable of generating and modulating a radio signal and transmitting said modulated radio signal to said aircraft and further capable of generating a radar signal, transmitting said radar signal to said aircraft and detecting return radar signals reflected from said aircraft that indicate a kinematic maneuver by said aircraft; and
a first aircraft equipped with a receiver capable of receiving said modulated radio signal, comparing said modulated radio signal to a pre-arranged modulated radio signal and directing an aircrew to execute said kinematic maneuver when said modulated radio signal is substantially the same as said pre-arranged modulated radio signal.

21. The system as in claim 20, wherein said apparatus comprises:
a first system being a radio transmitter capable of generating, modulating and transmitting said modulated radio signal; and
a second system being a radar system capable of generating said radar signal, transmitting said radar signal to said aircraft and detecting said return radar signals reflected from said aircraft.

22. The system as in claim 20, wherein said receiver directs said aircrew to execute said kinematic maneuver being a pre-arranged kinematic maneuver that confirms that said first aircraft is a friendly aircraft.

23. The system as in claim 20, further comprising a processor capable of directing said apparatus to produce said modulated radio signal when no responsive signal to said interrogating signal is received within a pre-determined time period following said interrogation system transmitting said interrogating signal to said aircraft, said modulated radio signal being a pre-arranged modulated radio signal.

24. The system as in claim 23, wherein said processor is further capable of directing said apparatus to generate and transmit said radar signal when no responsive signal to said interrogating signal is received within a pre-determined time period following said interrogation system transmitting said interrogating signal to said aircraft.

25. The system as in claim 20, wherein said first aircraft further comprises a transponder that, when functional, is capable of decoding an encrypted message in said interrogating signal and transmitting an encrypted message responsive thereto.

26. The system as in claim 21, further comprising a processor capable of confirming said aircraft as a friendly aircraft based on said radar system detecting said return radar signals reflected from said aircraft that indicate a kinematic maneuver by said aircraft.

* * * * *